(12) United States Patent
Hu (10) Patent No.: US 9,430,103 B2
(45) Date of Patent: Aug. 30, 2016

(54) METHOD AND DEVICE FOR SENSING CONTROL POINT ON CAPACITIVE-TYPE PANEL

(71) Applicant: TOUCHPLUS INFORMATION CORP., New Taipei (TW)

(72) Inventor: Shih-Hsien Hu, New Taipei (TW)

(73) Assignee: TOUCHPLUS INFORMATION CORP., New Taipei (TW)

( * ) Notice: Subject to any disclaimer, the term of this patent is extended or adjusted under 35 U.S.C. 154(b) by 96 days.

(21) Appl. No.: 14/162,004

(22) Filed: Jan. 23, 2014

(65) Prior Publication Data

US 2014/0333575 A1  Nov. 13, 2014

(30) Foreign Application Priority Data

May 8, 2013 (TW) .............................. 102116390 A
Oct. 9, 2013 (TW) .............................. 102136596 A (51) Int. Cl.
G06F 3/044 (2006.01)
G06F 3/041 (2006.01)

(52) U.S. Cl.
CPC .............. *G06F 3/044* (2013.01); *G06F 3/0416* (2013.01)

(58) Field of Classification Search
CPC ....................................................... G06F 3/041
USPC ................................................. 345/173–175
See application file for complete search history.

(56) References Cited

U.S. PATENT DOCUMENTS

| | | | |
|---|---|---|---|
| 6,452,514 B1 * | 9/2002 | Philipp ................ | G01D 5/2405 178/18.06 |
| 2007/0247443 A1 | 10/2007 | Philipp | |
| 2010/0258360 A1 * | 10/2010 | Yilmaz .................. | G06F 3/044 178/18.06 |
| 2011/0227863 A1 | 9/2011 | Cheng et al. | |
| 2012/0075224 A1 * | 3/2012 | Chang et al. ................. | 345/173 |

(Continued)

FOREIGN PATENT DOCUMENTS

| | | |
|---|---|---|
| JP | 2007293865 | 11/2007 |
| TW | 201133315 | 10/2011 |

(Continued)

OTHER PUBLICATIONS

Taiwan Patent Search Report issued on Oct. 23, 2015, Taiwan Patent Office, Taiwan.
Japan Patent Office "Search Report", Mar. 22, 2016.

*Primary Examiner* — Grant Sitta
(74) *Attorney, Agent, or Firm* — WPAT, PC; Justin King (57) ABSTRACT

For sensing a control point on a capacitive-type panel, first and second voltage signals are respectively received through two sets of receiving lines selected from N receiving lines in response to first and second charge/discharge signals transmitted through two sets of transmitting lines selected from M transmitting lines, respectively, during a first time period. Third and fourth voltage signals are received through two sets of receiving lines selected from the N receiving lines in response to third and fourth charge/discharge signals respectively transmitted through the two sets of transmitting lines, respectively, during a second time period. A characteristic value is generated according to the first, second, third and fourth voltage signals. Repeat the steps to generate characteristic values for neighboring regions defined by different combinations of transmitting lines and receiving lines. Position information of control point(s) on the capacitive-type panel is estimated accordingly.

8 Claims, 10 Drawing Sheets

(56) References Cited

U.S. PATENT DOCUMENTS

2012/0227259 A1 9/2012 Badaye et al.
2012/0268144 A1 10/2012 Ahn et al.

FOREIGN PATENT DOCUMENTS

TW 201243686 11/2012
WO WO2012173068 12/2012

* cited by examiner

FIG. 1

101 — inputting a first charge/discharge signal and a second charge/discharge signal through at least two sets of signal transmitting lines selected among M signal transmitting lines, respectively, and then receiving corresponding first voltage signal and second voltage signal through at least two sets of signal receiving lines selected among N signal receiving lines, during a first time period, and outputting a first voltage difference value or its equivalent function value by comparing the first and second voltage signals

|     | X₋₁ | X₀ | X₁ |
|-----|-----|----|----|
| Y₋₁ | −   | +  | 0  |
| Y₀  | +   | −  | 0  |
| Y₁  | 0   | 0  | 0  |

FIG. 4A

|     | X₋₁ | X₀ | X₁ |
|-----|-----|----|----|
| Y₋₁ | −   | +  | 0  |
| Y₀  | 0   | 0  | 0  |
| Y₁  | +   | −  | 0  |

FIG. 4B

|     | X₋₁ | X₀ | X₁ |
|-----|-----|----|----|
| Y₋₁ | −   | 0  | +  |
| Y₀  | +   | 0  | −  |
| Y₁  | 0   | 0  | 0  |

FIG. 4C

|     | X₋₁ | X₀ | X₁ |
|-----|-----|----|----|
| Y₋₁ | −   | 0  | +  |
| Y₀  | 0   | 0  | 0  |
| Y₁  | +   | 0  | −  |

METHOD AND DEVICE FOR SENSING CONTROL POINT ON CAPACITIVE-TYPE PANEL

FIELD OF THE INVENTION

The invention relates to method and device for sensing a control point, and more particularly to method and device for sensing a control point on a capacitive-type panel.

BACKGROUND OF THE INVENTION

According to different working principles, common touch panels can be classified into resistive-type touch panels and capacitive-type touch panels. When a user touches or approaches the surface of the capacitive-type touch panel with his finger or a conductive object, the capacitance of the capacitive-type touch panel changes accordingly. A touch position can be located by sensing and calculating the capacitance change. A conventional two-dimensional capacitive-sensing touch panel is mainly constituted of two sets of sensing pads respectively arranged horizontally and vertically, and the two sets of sensing pads are isolated at their intersected parts with insulating material so that capacitors are formed. A two-dimensional capacitive-sensing touch panel is a mainstream among current capacitive-sensing touch panels because it can detect multiple touch points at the same time so as to meet the demand on multipoint touch sensing in the market.

SUMMARY OF THE INVENTION

For the conventional sensing technology of the two-dimensional type capacitive-sensing touch panel, since it is required that the amount of the sensing pads is increased and areas of the sensing pads are reduced so as to increase the sensing resolution. Thus, the amount of sensing pins of a driving circuit increases and thus hardware costs increase. A major object of the invention is to improve this disadvantage.

The invention provides a method for sensing a control point on a capacitive-type panel, where a conductive object approaches or contacts, the capacitive-type panel including M signal transmitting lines, N signal receiving lines and M*N capacitors formed at neighboring regions of the signal transmitting lines and signal receiving lines, the method being executed by a sensing device and comprising steps of: receiving a first voltage signal and a second voltage signal through two sets of signal receiving lines selected from the N signal receiving lines in response to a first charge/discharge signal and a second charge/discharge signal transmitted through two sets of signal transmitting lines selected from the M signal transmitting lines, respectively, during a first time period; receiving a third voltage signal and a fourth voltage signal through the two sets of signal receiving lines selected from the N signal receiving lines in response to a third charge/discharge signal and a fourth charge/discharge signal transmitted through the two sets of signal transmitting lines, respectively, during a second time period; and generating a characteristic value for an equivalent capacitor corresponding to a neighboring region defined by the two sets of signal transmitting lines and the two sets of signal receiving lines according to the first voltage signal, the second voltage signal, the third voltage signal and the fourth voltage signal; wherein the above three steps are repetitively performed so as to generate a plurality of characteristic values for a plurality of neighboring regions defined by different combinations of signal transmitting lines and signal receiving lines, and position information of at least one control point on the capacitive-type panel is estimated according to the characteristic values.

The invention also provides a device for sensing a control point on a capacitive-type panel, where a conductive object approaches or contacts, the capacitive-type panel including M signal transmitting lines, N signal receiving lines and M*N capacitors formed at neighboring regions of the signal transmitting lines and signal receiving lines, the device comprising: a charge/discharge signal generator electrically connected to the M signal transmitting lines, the charge/discharge signal generator inputting a first charge/discharge signal and a second charge/discharge signal respectively to two sets of signal transmitting lines selected from the M signal transmitting lines during a first time period, and inputting a third charge/discharge signal and a fourth charge/discharge signal respectively to the two sets of signal transmitting lines during a second time period; and a voltage signal processor electrically connected to the N signal receiving lines, the voltage signal processor receiving a first voltage signal and a second voltage signal respectively from two sets of signal receiving lines selected from the N signal receiving lines during the first time period, receiving a third voltage signal and a fourth voltage signal respectively from two sets of signal receiving lines selected from the N signal receiving lines during the second time period, generating a characteristic value for an equivalent capacitor corresponding to a neighboring region defined by the two sets of signal transmitting lines and the two sets of signal receiving lines according to the first voltage signal, the second voltage signal, the third voltage signal and the fourth voltage signal, wherein the above three steps are repetitively performed so as to generate a plurality of characteristic values for a plurality of neighboring regions defined by different combinations of signal transmitting lines and signal receiving lines, and position information of at least one control point on the capacitive-type panel is estimated according to the characteristic values.

In a preferred embodiment of the method and device for sensing a control point according to the invention, the first charge/discharge signal is a charge signal rising from a low voltage to a high voltage, the second charge/discharge signal is a discharge signal falling from a high voltage to a low voltage, the third charge/discharge signal is a discharge signal falling from a high voltage to a low voltage, and the fourth charge/discharge signal is a charge signal rising from a low voltage to a high voltage.

In a preferred embodiment according to the invention, in the method and device for sensing a control point, the characteristic values are configured as a characteristic value array, and the position information of the at least one control point on the capacitive-type panel is estimated according to a data pattern included in the characteristic value array.

In a preferred embodiment of the above-mentioned method and device for sensing a control point according to the invention, each of the characteristic values is a positive number, a negative number or zero.

In a preferred embodiment of the above-mentioned method and device for sensing a control point according to the invention, the position information of the al least one control point is estimated by: performing an operation on a 3*3 data array selected from the characteristic value array; determining the position information of the control point and a first offset vector when the result of the operation meets a first condition; determining the position information of the control point and a second offset vector when the result of the operation meets a second condition; determining the position information of the control point and a third offset vector when the result of the operation meets a third condition; and determining the position information of the control point and a fourth offset vector when the result of the operation meets a fourth condition.

Since sensing operation according to the invention is performed for at least two lines, at the same wiring density, the resolution of the invention can be increased to two times at two dimensions, and thus the overall resolution can be increased to four times.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
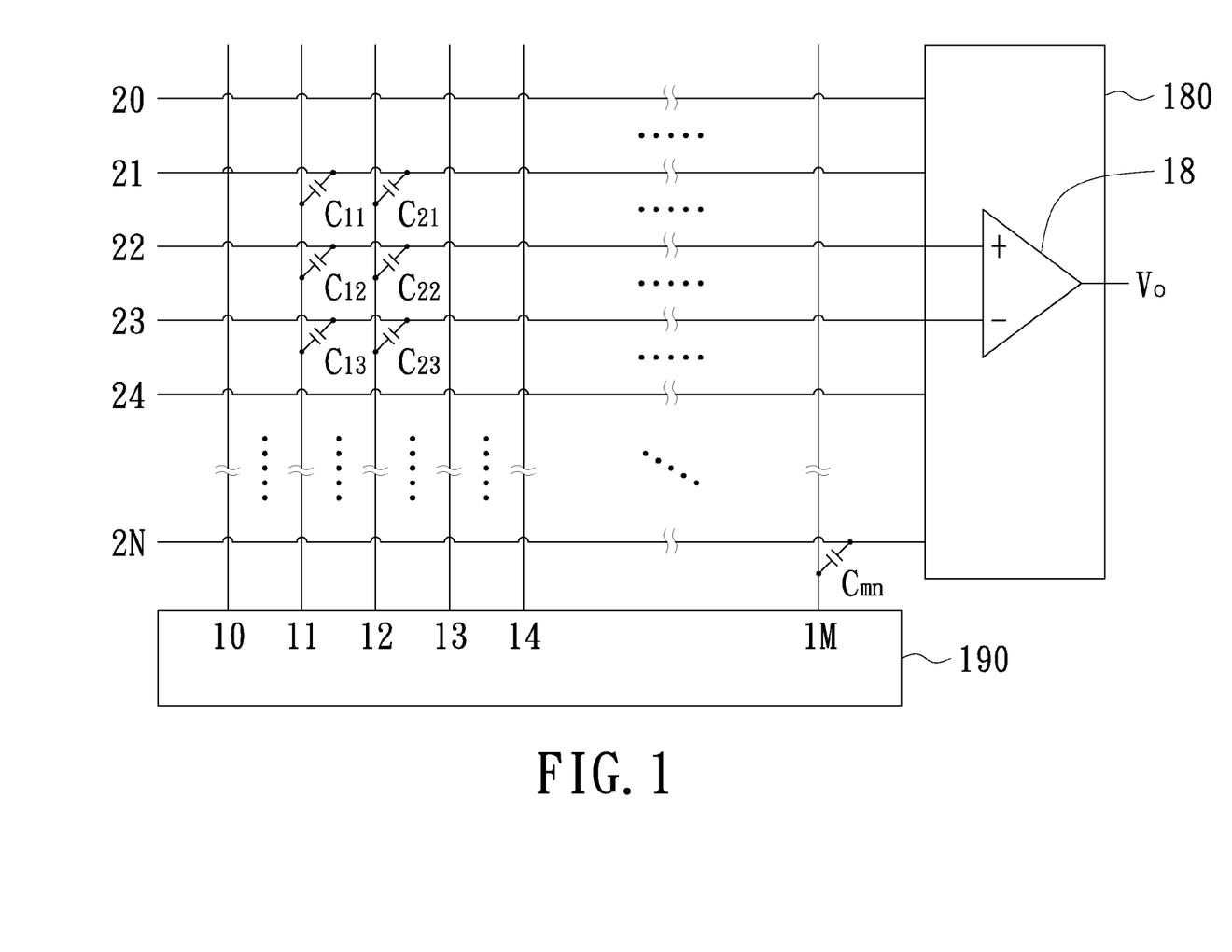
FIG. 1 is a schematic diagram showing a capacitive-type panel where an embodiment of a control point sensing device according to the invention is adapted to be used.

Please refer to FIG. 1, in which circuitry of a capacitive-type panel is schematically illustrated. As shown M signal transmitting lines 11~1M and N signal receiving lines 21~2N are vertically and horizontally allocated, respectively, and M*N capacitors C11~Cmn are formed at neighboring regions (in this embodiment, crossover regions, but can also be parallel in the same plane) of the signal lines. The proximity or touch of a user's finger or any other conductive object to a specified one of the capacitors will result in a capacitance change of the specified capacitor.

According to the sensing method of the invention, the capacitors can effectively function at capacitances of about 100 fF-10 pF. This shows that the invention achieves a considerable improvement as compared to prior arts which can only function effectively at 1-5 pF. A charge/discharge signal generator 190 is electrically connected to the M signal transmitting lines 11~1M for generating charge/discharge signals, and a voltage signal processor 180 is electrically connected to the N signal receiving lines 21~2N for receiving and further processing voltage signals generated from the signal receiving lines 21~2N. In order to ameliorate the disadvantage of the prior art, the invention provides a new sensing method including steps as shown in the flowchart of FIGS. 2A-2C.

Figure 2A:
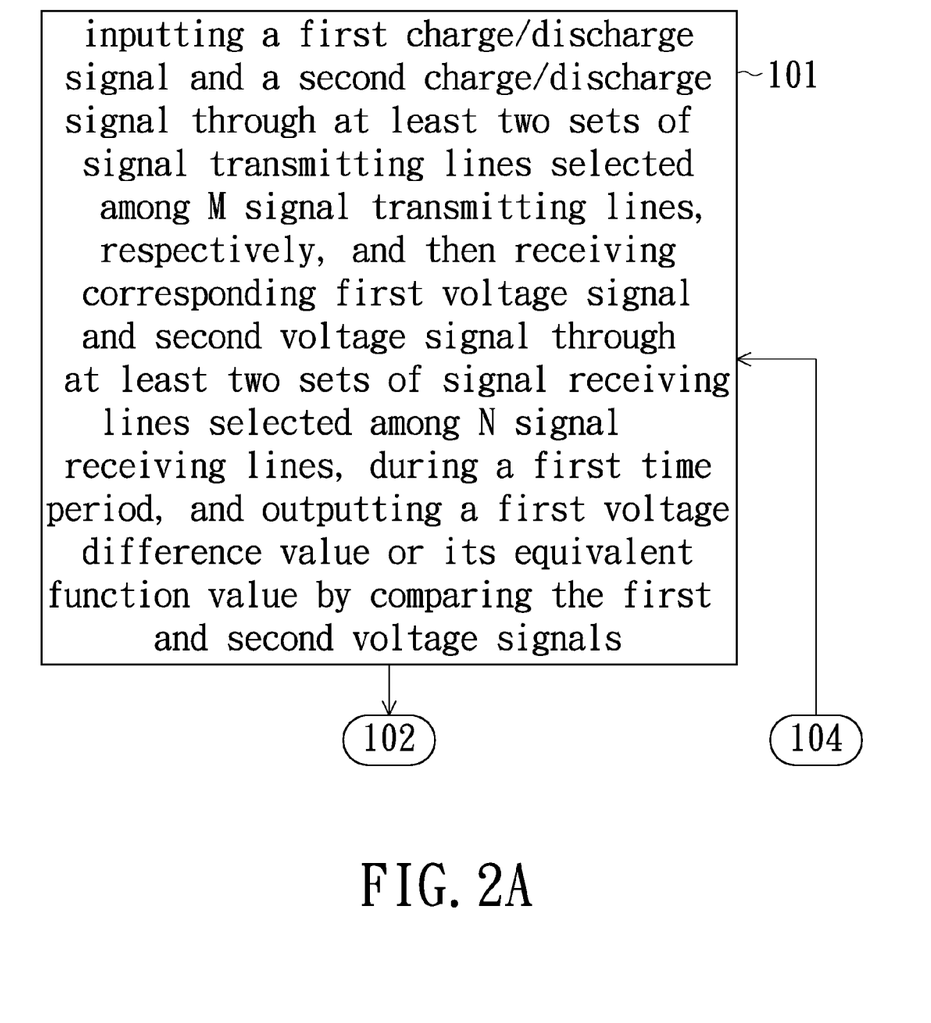
FIGS. 2A-2C are a flowchart showing steps of an embodiment of a control point sensing method according to the invention.
Figure 2B:
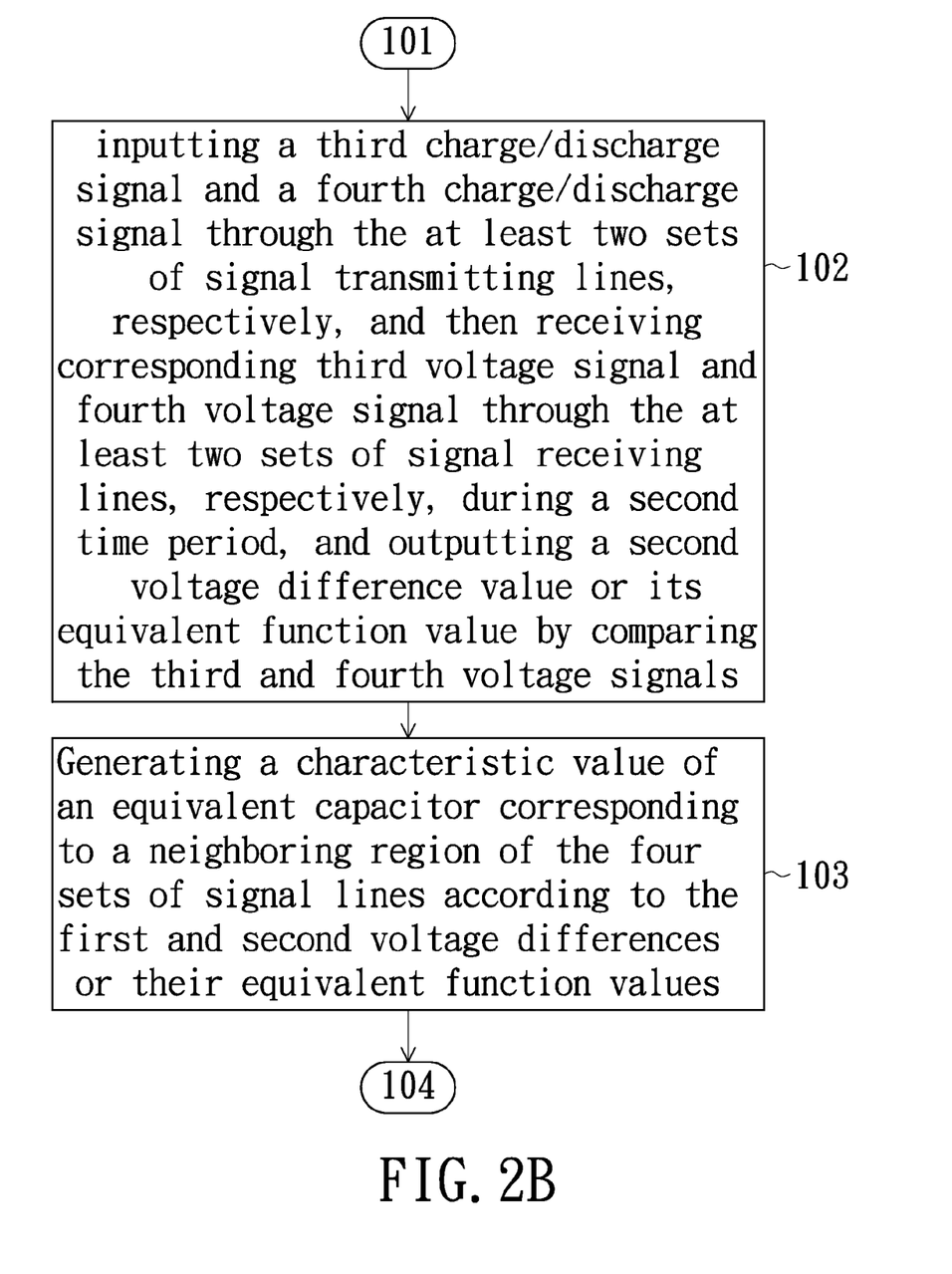
Figure 2C:
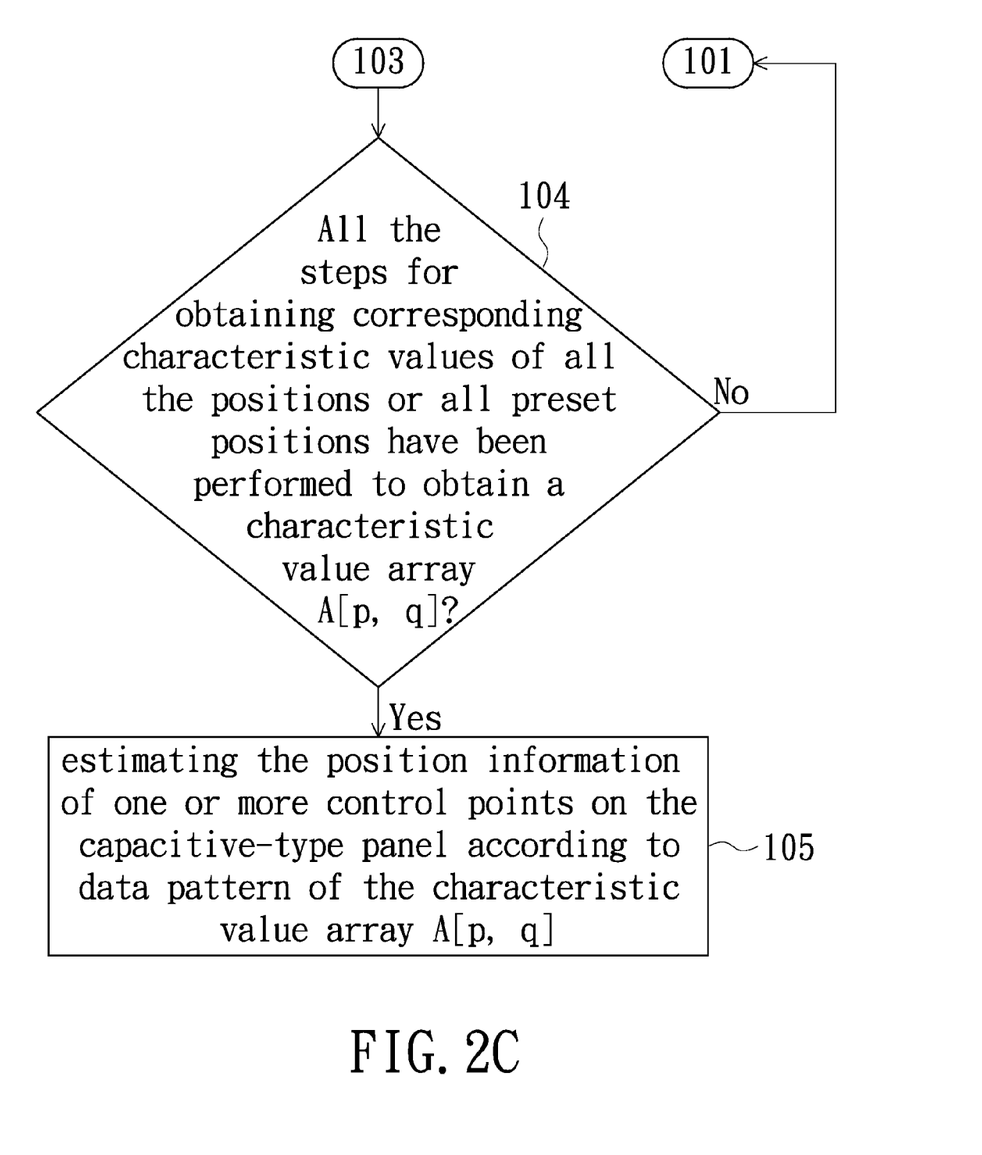

As shown in FIG. 2A, in step 101, the charge/discharge signal generator 190 has a first charge/discharge signal and a second charge/discharge signal respectively inputted through at least two sets of signal transmitting lines selected among the M signal transmitting lines 11~1M and then the voltage signal processor 180 receives a first voltage signal and a second voltage signal, which are generated corresponding to the first charge/discharge signal and the second charge/discharge signal, respectively, through at least two sets of signal receiving lines selected among N signal receiving lines during a first time period. For example, the two sets of signal transmitting lines can be adjacent signal transmitting lines 12, 13, while the two sets of signal receiving lines can be adjacent two signal receiving lines 22, 23. The first charge/discharge signal can be a charge signal rising from 0V to 3V (refer to FIG. 3B), the second charge/discharge signal can be a discharge signal falling from 3V to 0V (refer to FIG. 3B). The first voltage signal and the second voltage signal respectively received from the adjacent two signal receiving lines 22, 23 can be compared in a comparator circuit 18 shown in FIG. 1 and then a first voltage difference value or a function value equivalent to the first voltage difference value is outputted via an output terminal Vo according to the comparison result of the first voltage signal and the second voltage signal. For example, a function value with the same polarity but nonlinear to the first voltage difference value can be obtain by a different comparing method or circuit; or functions of the first voltage difference value and the second voltage difference value can be obtained by adjusting the level of the charge/discharge signal. The details will be described below.

Next, in step 102, the charge/discharge signal generator 190 has a third charge/discharge signal and a fourth charge/discharge signal respectively inputted through the same sets of signal transmitting lines, and then the voltage signal processor 180 receives corresponding third voltage signal and fourth voltage signal respectively through the same sets of signal receiving lines during a second time period. That is, the two sets of signal transmitting lines are the adjacent signal transmitting lines 12, 13, while the two sets of signal receiving lines are the adjacent two signal receiving lines 22, 23. In this step, the third charge/discharge signal is a discharge signal falling from 3V to 0V (refer to FIG. 3B), while the fourth charge/discharge signal is a charge signal rising from 0V to 3V (refer to FIG. 3B), and the third voltage signal and the fourth voltage signal respectively received from the adjacent two signal receiving lines 22, 23 are compared in the comparator circuit 18 shown in FIG. 1 so as to output a second voltage difference value or a function value equivalent to the second voltage difference value via the output terminal Vo according to the comparison result of the third voltage signal and the fourth voltage signal. For example, a function value with the same polarity but nonlinear to the second voltage difference value can be obtain by a different comparing method or circuit; or functions of the third voltage difference value and the fourth voltage difference value can be obtained by adjusting the level of the charge/discharge signal. The details will be described below.

Next, in step 103, the voltage signal processor 180 generates a characteristic value of an equivalent capacitor corresponding to a neighboring region of the four sets of signal lines according to the first voltage difference value or its equivalent function value and the second voltage difference value or its equivalent function value. In this embodiment, the characteristic value of the equivalent capacitor corresponding to the crossover region of the adjacent signal transmitting lines 12, 13 and the adjacent signal receiving lines 22, 23 is generated. For example, the characteristic value of the capacitor C22 can be defined as the difference obtained by subtracting the second voltage difference value or its function value from the first voltage difference value or its function value.

The voltage signal processor 180 repeats the above-mentioned steps 101~103 for all the other sets of signal transmitting lines and all the other sets of signal receiving lines, e.g. adjacent signal transmitting lines and the adjacent signal receiving lines, to generate a plurality of characteristic values, thereby obtaining a characteristic value array A[p, q]. Afterwards, the characteristic value array A[p, q] can be used to estimate position information of one or more control points on the capacitive-type panel in a subsequent step, wherein each control point is a position to which a finger or other conductive object approaches on the capacitive-type panel. When it is determined that all the required steps for obtaining corresponding characteristic values of all the positions or all preset positions have been performed in step 104, then the method proceeds to step 105.

In step 105, the position information of one or more control points on the capacitive-type panel are estimated according to data pattern of the characteristic value array A[p, q]. The control point is a position to which a finger or other conductive object approaches on the capacitive-type panel. Step 105 can be performed in a control circuit chip, which includes the voltage signal processor 180, of the capacitive-type panel. Alternatively, the characteristic value array A[p, q] can be transmitted to an information system where the capacitive-type panel is applied, for example, a notebook computer, a tablet computer etc. In this example, step 105 is executed in the information system. The details of the above-mentioned technology will be described hereinafter with reference to FIGS. 3A and 3B, in which a circuit structure and a signal waveform are schematically shown. However, the implementation of the invention is not limited to the following examples. Since in the above-mentioned embodiment a unit to be sensed involve adjacent two signal transmitting lines and adjacent two signal receiving lines, a window 20 covering the crossover region defined by four signal lines, e.g. adjacent two signal transmitting lines and adjacent two signal receiving lines, can be moved, as a whole, over the capacitive-type panel for scanning. When the window 20 is moved to the crossover region defined by the signal lines $X_0$, $X_1$, $Y_0$, $Y_1$, and a relative position of an approaching or contact point of a finger (or a conductor) to the window 20 is substantially an upper right intersection 1 of the signal lines $X_1$ and $Y_0$, the first voltage difference value and second voltage difference value obtained through steps 101 and 102 will be +ΔV and −ΔV, respectively. Accordingly, the characteristic value obtained in step 103, i.e. subtracting the second voltage difference value from the first voltage difference value, will be +2ΔV. In another case that the relative position of an approaching or contact point of a finger (or a conductor) to the window 20 is substantially a lower right intersection 2 of the signal lines $X_1$ and $Y_1$, the first voltage difference value and second voltage difference value obtained through steps 101 and 102 will be −ΔV and +ΔV, respectively. Accordingly, the characteristic value obtained in step 103, i.e. subtracting the second voltage difference value from the first voltage difference value, will be −2ΔV. Alternatively, if a relative position of an approaching or contact point of a finger (or a conductor) to the window 20 is substantially a lower left intersection 3 of the signal lines $X_0$ and $Y_1$, the first voltage difference value and second voltage difference value obtained through steps 101 and 102 will be +ΔV and −ΔV, respectively. Accordingly, the characteristic value obtained in step 103, i.e. subtracting the second voltage difference value from the first voltage difference value, will be +2ΔV. Likewise, in the case that a relative position of an approaching or contact point of a finger (or a conductor) to the window 20 is substantially an upper left intersection 4 of the signal lines $X_0$ and $Y_0$, the first voltage difference value and second voltage difference value obtained through steps 101 and 102 will be −ΔV and +ΔV, respectively. Accordingly, the characteristic value obtained in step 103, i.e. subtracting the second voltage difference value from the first voltage difference value, will be −2ΔV. On the other hand, when a finger (or a conductor) approaches or contacts the window 20 substantially at a position 5, 6, 7 or 8 shown in FIG. 3A, i.e. a position outside the window 20, the characteristic value obtained through steps 101~103 in each case will have the same polarity with the corresponding position 1, 2, 3, or 4 but a smaller absolute value.

Figure 3A:
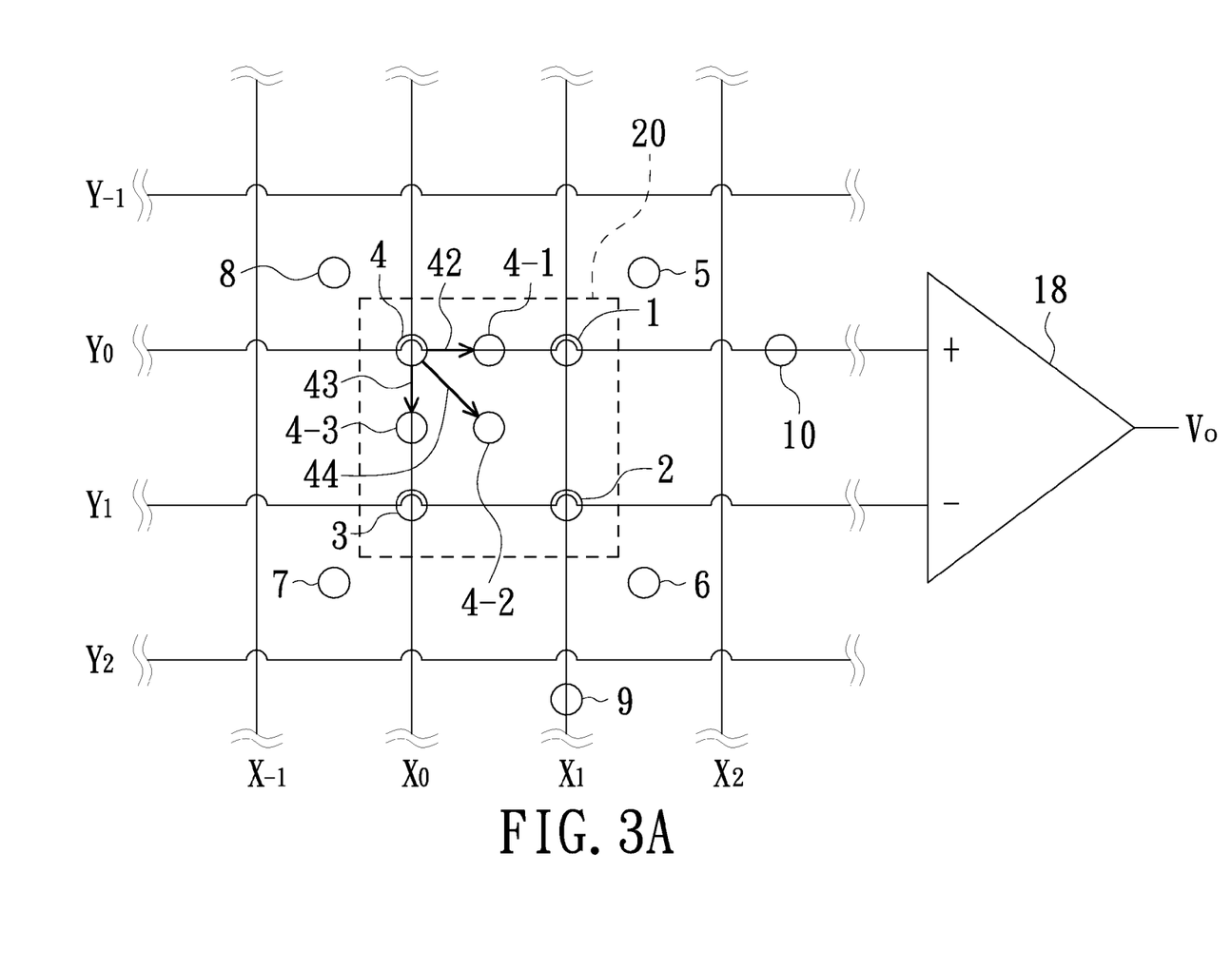
FIG. 3A is a schematic diagram showing a portion of the circuit structure as illustrated in FIG. 1.

Furthermore, if a finger (or a conductor) approaches or contacts the window 20 substantially at a position 9 as shown in FIG. 3A, the first voltage difference value obtained in step 101 and the second voltage difference value obtained in step 102 will both be 0 on a condition that the charge/discharge signal on the signal transmitting line is strong enough. Accordingly, the characteristic value obtained by subtracting the second voltage difference value from the first voltage difference value in step 103 will be 0. In a further example that a finger (or a conductor) approaches or contacts the window 20 substantially at a position 10 as shown in FIG. 3A, since the first voltage difference value obtained in step 101 and the second voltage difference value obtained in step 102 are respectively −ΔV and −ΔV, the characteristic value obtained by subtracting the second voltage difference value from the first voltage difference value in step 103 will be 0. In this case that the window 20 is located at the crossover region of the signal lines $X_0$, $X_1$, $Y_0$, $Y_1$, if there is no finger (nor conductor) approaching or contacting the panel, or a relative position of an approaching or contacting point of the finger (or conductor) to the window 20 is substantially at a position (4-1), a position (4-2) or a position (4-3), a characteristic value obtained through steps 101~103 will be 0. In this way, after the whole capacitive-type panel is scanned with the window 20 defined with 2*2 signal lines, a characteristic value array A[p, q] is generated, in which characteristic values obtained in the above-mentioned steps and corresponding to specified positions of the window are stored. The characteristic values can be positive, negative or 0, for example simply represented by +, − and 0.

Figure 4A:
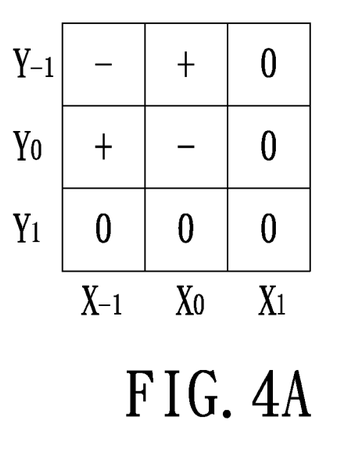
FIGS. 4A-4D are schematic diagrams showing examples of characteristic value arrays generated in the control point sensing method as illustrated in the flowchart of FIGS. 2A-2C.

An analysis is then performed according to the data pattern of the characteristic value array A[p, q]. Position information of one or more control point on the capacitive-type panel can be estimated in step 104. The control point is a position which a finger approaches or contacts on the capacitive-type panel. For example, if there is no finger approaching or contacting the capacitive-type panel, all of the data recorded into the characteristic value array A[p, q] as obtained in the scanning steps during a preset time period are 0. On the other hand, if a finger is approaching or contacting an intersection of a signal transmitting line and a signal receiving line, e.g. $X_0$ and $Y_0$, of the capacitive-type panel, the characteristic value corresponding to the specified position and eight characteristic values corresponding to eight surrounding positions form a 3*3 data array, e.g. the array as shown in FIG. 4A. Therefore, by performing an operation on a 3*3 data array, the position which a finger approaches or contacts on the capacitive-type panel can be specified. For example, when the result of the operation meets a first pattern, e.g. the pattern as shown in FIG. 4A, it is determined that the estimated control point is ($X_0$, $Y_0$) and an offset vector associated with the control point is ($X_0$, $Y_0$) is 0. That is, when the characteristic value array A[p, q] includes a data pattern as shown in FIG. 4A, it is realized that there is a control point at ($X_0$, $Y_0$). If the characteristic value array A[p, q] includes more than one data pattern like the one shown in FIG. 4A with zero offset, it is realized that there exists another control point at a specific intersection of a signal transmitting line and a signal receiving line.

Figure 4B:
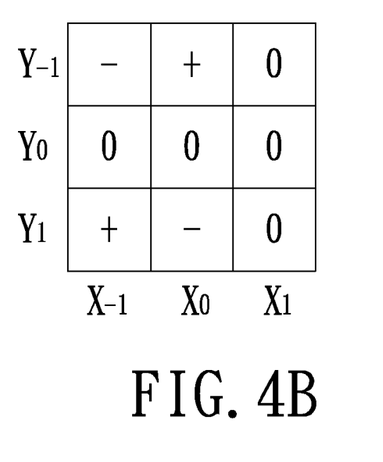
Figure 4C:
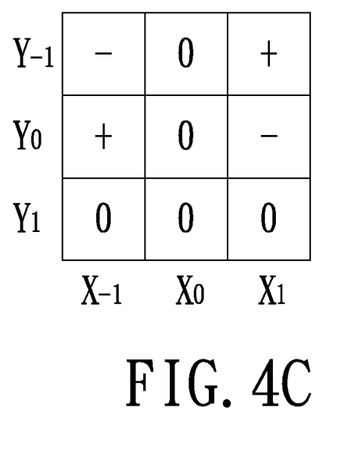
Figure 4D:
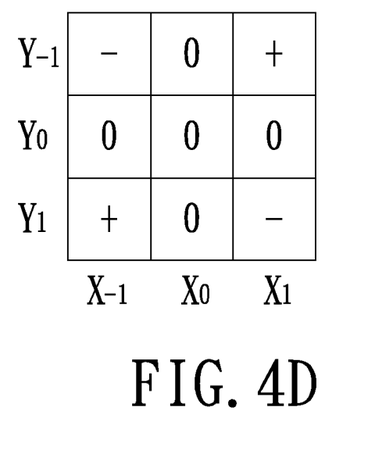

In addition, when a part of the characteristic value array A[p, q] has a data pattern as shown in any one of FIGS. 4B-4D, it is also estimated that there exists one control point. The control point is not at the intersection but nearby the intersection ($X_0$, $Y_0$) with a second offset vector 42, a third offset vector 43, or a fourth offset vector 44. For example, the data pattern shown in FIG. 4B indicates that a control point is below the intersection ($X_0$, $Y_0$) (for example, the position (4-3) shown in FIG. 3), the data pattern shown in FIG. 4C indicates that a control point is at right side of the intersection ($X_0$, $Y_0$) (for example, the position (4-1) shown in FIG. 3), and the data pattern shown in FIG. 4D indicates that a control point is at lower right of the intersection ($X_0$, $Y_0$) (for example, the position (4-2) shown in FIG. 3). Therefore, at the same wiring density, the resolution of the invention can be increased to two times at two dimensions, and thus the overall resolution can be increased to four times.

Figure 3B:
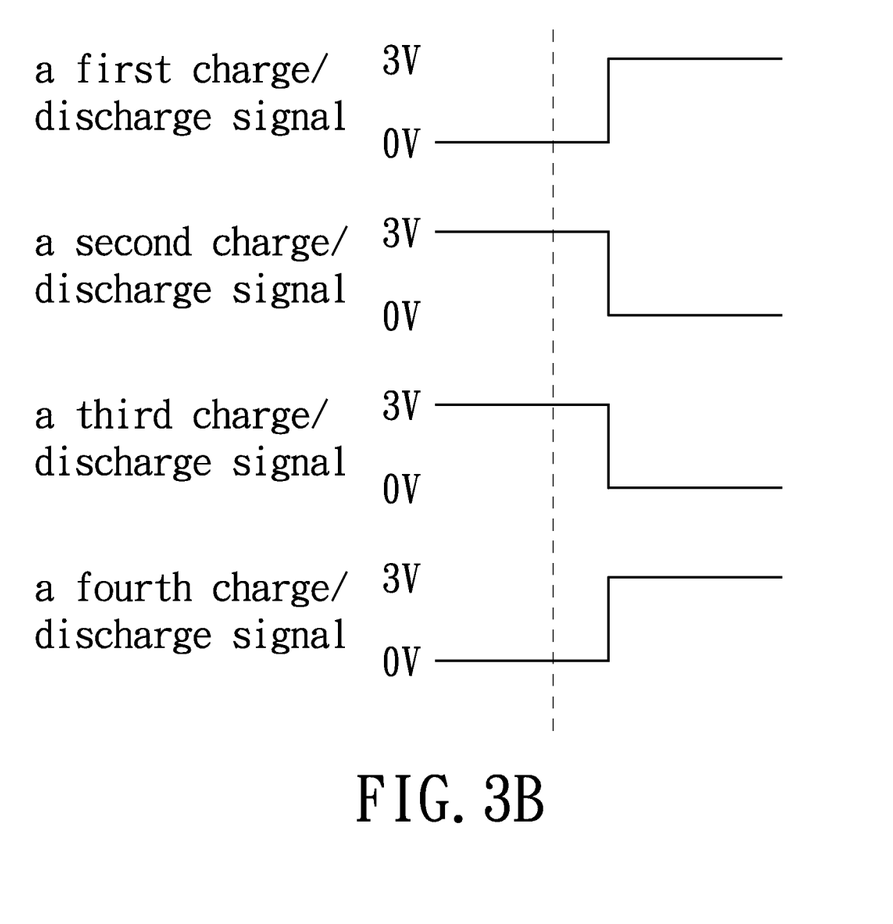
FIG. 3B is a waveform diagram showing signals associated with the control point sensing method as illustrated in the flowchart of FIGS. 2A-2C.

The examples of the charge/discharge signals shown in FIG. 3B are only for description, it is not limited to a signal falling from 3V to 0V or a signal rising from 0V to 3V. The object of sensing can be achieved by using any signal that falls from a larger fixed voltage to a smaller fixed voltage or rises from another smaller fixed voltage to another larger fixed voltage. The signals for sensing are set to be 0V and 3V for the purpose to maintain a balance of the circuit design.

Since the position detection is performed with two adjacent signal transmitting lines and two adjacent signal receiving lines, it is necessary to provide dummy signal lines 10, 20 as shown in FIG. 1 at each edge of the X-direction and Y-direction of the capacitive-type panel, so as to perform the above-mentioned operation to the signal transmitting line 11 and the signal receiving line 21. However, it is not necessary to provide a capacitor to the dummy signal line. Of course, it is also possible to omit the dummy signal line, and directly mirror the signal transmitting line 12 and the signal receiving line 22 to be virtual dummy signal lines 10, 20, so as to perform the above-mentioned operation to the signal transmitting line 11 and the signal receiving line 21.

Figure 5:
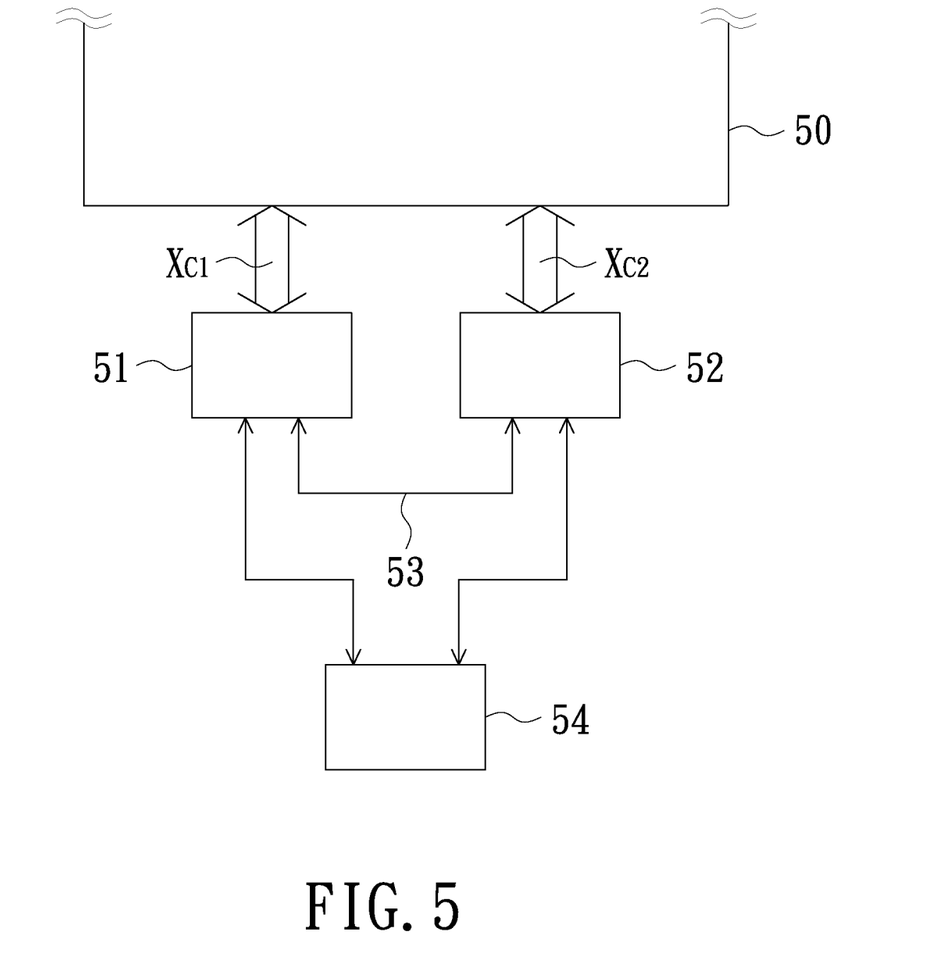
FIG. 5 is a functional block diagram schematically showing an exemplified use of a control point sensing device according to the invention in a panel requiring more than one chip for sensing control.

Further, please refer to FIG. 5, which is a functional block diagram schematically showing an exemplified use of the invention in more than one sensing chip to control the same capacitive-type panel 50. In FIG. 5 two sensing chips are used as an example, different sets of signal transmitting or receiving lines Xc1, Xc2 are processed by different sensing chips 51, 52, and a reference voltage transmission line 53 is disposed between the sensing chips 51, 52 so as to transmit a reference voltage signal to all sensing chips as a reference. By this way, when performing comparison operation to voltage signals, which are generated by the signal receiving lines belonging to different sensing chips, a consistent reference voltage is provided. The voltage difference values obtained in steps 101, 102 or the characteristic value obtained in step 103 can be transmitted by the sensing chips 51, 52 to a microprocessor 54 at back-end, so that corresponding position information of a control point can be obtained. Thus, a major object of the invention can be achieved.

Figure 6:
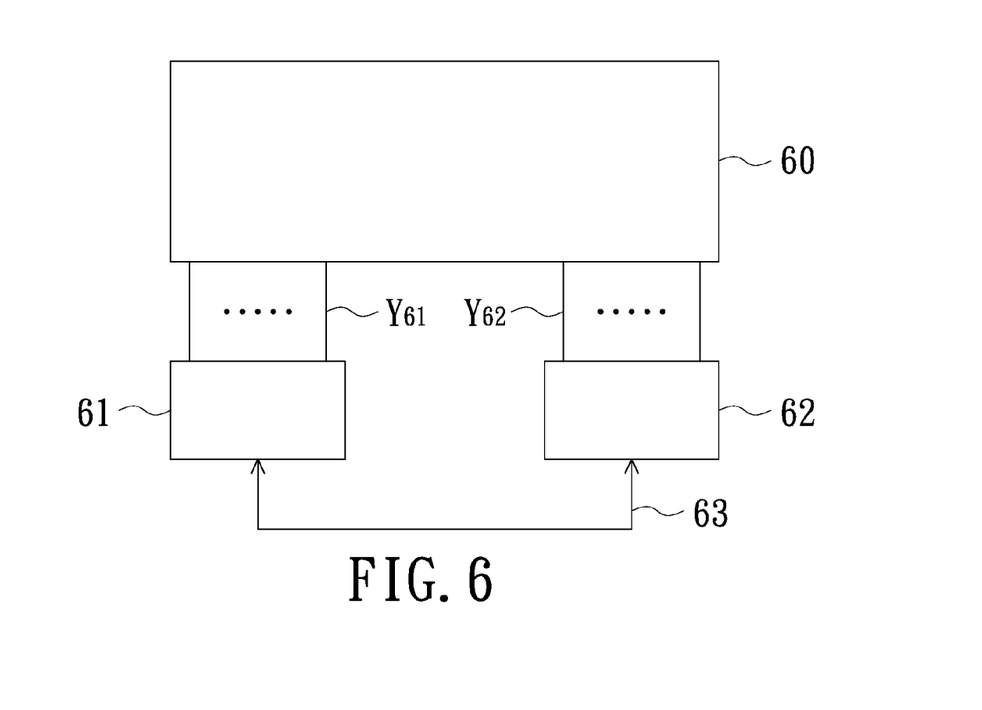
FIG. 6 is a functional block diagram schematically showing another exemplified use of a control point sensing device according to the invention in a panel requiring more than one chip for sensing control.
Figure 7:
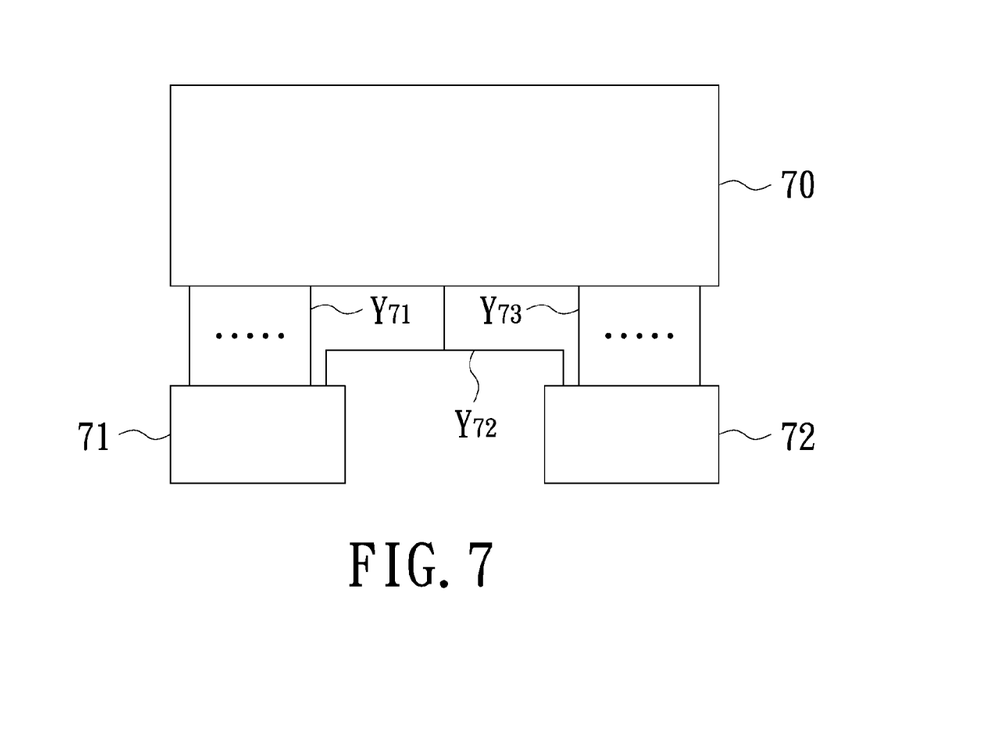
FIG. 7 is a functional block diagram schematically showing a further exemplified use of a control point sensing device according to the invention in a panel requiring more than one chip for sensing control.

In addition, please refer to FIG. 6, if adjacent signal receiving lines Y61, Y62 in a capacitive-type panel 60 belong to different chips 61, 62, a signal transmission line (for example, a transmission line 63 in FIG. 6) interconnecting the chips 61, 62 with each other can be used to transmit a voltage signal from adjacent one or more signal line to the other chip as a reference. By this way, the above-mentioned operation can be completed and thus a major object of the invention can be achieved. On the other way, as shown in FIG. 7, a signal receiving line Y72 between signal receiving lines Y71 and Y73 on a capacitive-type panel 70 is connected to different chips 71, 72, so that a voltage signal from the signal receiving line Y72 can be referenced by both chips 71, 72. By this way, the above-mentioned operation can also be completed and thus a major object of the invention can be achieved.

Figure 8:
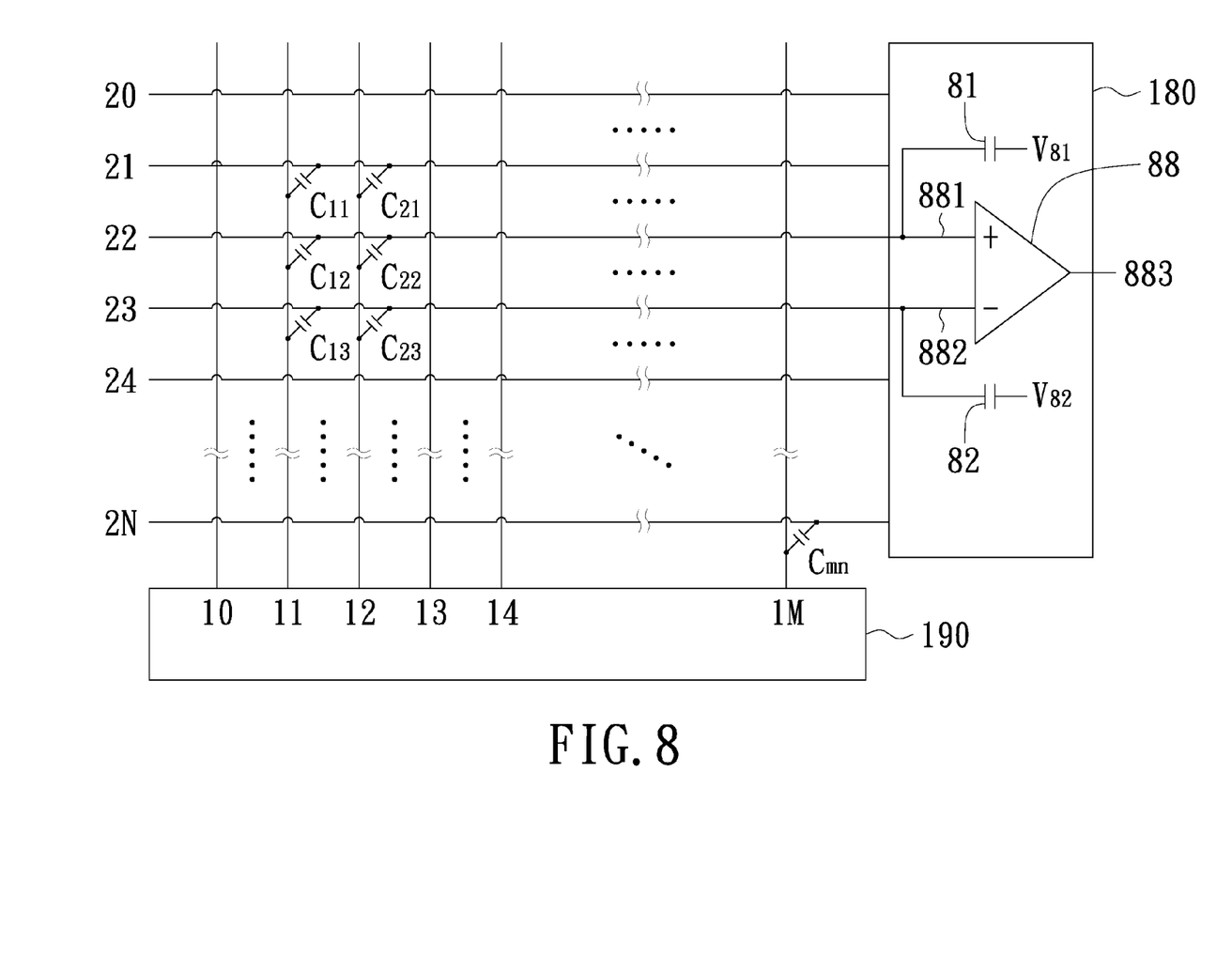
FIG. 8 is a schematic diagram showing another comparator circuit according to another embodiment of the invention in replacing the comparator circuit shown in FIG. 1.

Further, please refer to FIG. 8, which is a schematic diagram showing another comparator circuit 88 according to another embodiment of the invention in replacing the comparator circuit 18 shown in FIG. 1. In this embodiment, a first capacitor 81, a second capacitor 82 and the comparator circuit 88 are used to perform another comparing method. In detail, in step 101, the charge/discharge signal generator 190 the same has a first charge/discharge signal and a second charge/discharge signal respectively inputted through at least two sets of signal transmitting lines selected among the M signal transmitting lines 11~1M and then the voltage signal processor 180 receives a first voltage signal and a second voltage signal, which are generated corresponding to the first charge/discharge signal and the second charge/discharge signal, respectively, through at least two sets of signal receiving lines selected among N signal receiving lines during a first time period. For example, the two sets of signal transmitting lines can be adjacent signal transmitting lines 12, 13, while the two sets of signal receiving lines can be adjacent two signal receiving lines 22, 23. The first charge/discharge signal can be a charge signal rising from 0V to 3V (refer to FIG. 3B), and the second charge/discharge signal can be a discharge signal falling from 3V to 0V (refer to FIG. 3B). As for the first voltage signal and the second voltage signal respectively received from the adjacent two signal receiving lines 22, 23, two input terminals 881, 882 of the comparator circuit 88 are balanced by controlling levels of an input voltage V81 of the first capacitor 81 and an input voltage V82 of the second capacitor 82 shown in FIG. 8 so that the voltage outputted by an output terminal 883 is maintained at level "0", and the difference of the levels V81 and V82 when the input terminals 881, 882 are balanced is obtained as the first voltage difference value. Alternatively, by providing the input voltages V81, V82 with the same value but changing the capacitances of the first capacitor 81 and the second capacitor 82 can also balance the two input terminals 881, 882 of the comparator circuit 88 so that the voltage outputted by the output terminal 883 is maintained at level "0", and the difference of the capacitances of the first capacitor 81 and the second capacitor 82 when the input terminals 881, 882 are balanced is obtained as the function value equivalent to the first voltage difference value. Here, the comparator circuit 18 shown in FIG. 1 needs to be realized by an analog-to-digital converter; however, the comparator circuit 88 can be simply realized by a single-bit comparator.

Further, in step 102, the charge/discharge signal generator 190 has a third charge/discharge signal and a fourth charge/discharge signal respectively inputted through the two sets of signal transmitting lines and then the voltage signal processor 180 receives a third voltage signal and a fourth voltage signal, which are generated corresponding to the third charge/discharge signal and the fourth charge/discharge signal, respectively, through the two sets of signal receiving line. For example, the two sets of signal transmitting lines can be adjacent signal transmitting lines 12, 13, while the two sets of signal receiving lines can be adjacent two signal receiving lines 22, 23. The third charge/discharge signal can be a discharge signal falling from 3V to 0V (refer to FIG. 3B), and the fourth charge/discharge signal can be a charge signal rising from 0V to 3V (refer to FIG. 3B). As for the third voltage signal and the fourth voltage signal respectively received from the adjacent two signal receiving lines 22, 23, two input terminals 881, 882 of the comparator circuit 88 are balanced by controlling levels of the input voltage V81 of the first capacitor 81 and an input voltage V82 of the second capacitor 82 shown in FIG. 8 so that the voltage outputted by an output terminal 883 is maintained at level "0", and the difference of the levels V81 and V82 when the input terminals 881, 882 are balanced is obtained as the second voltage difference value. Alternatively, by providing the input voltages V81, V82 with the same value but changing the capacitances of the first capacitor 81 and the second capacitor 82 can also balance the two input terminals 881, 882 of the comparator circuit 88 so that the voltage outputted by the output terminal 883 is maintained at level "0", and the difference of the capacitances of the first capacitor 81 and the second capacitor 82 when the input terminals 881, 882 are balanced is obtained as the function value equivalent to the second voltage difference value.

In addition, adjacent two signal lines are used as examples for description in the above embodiments. However, in other embodiments of the invention, two sets or more of signal transmitting lines can also be selected from M signal transmitting lines to respectively input a charge/discharge signal, and correspondingly generated voltage signals can be received respectively by two sets or more of signal receiving lines selected from N signal receiving lines. Each set of signal transmitting lines can be consisted of a single signal transmitting line or a plurality of signal transmitting lines, and the two sets of signal transmitting lines can be not adjacent, but with other signal transmitting lines disposed therebetween. Of course, each set of signal receiving lines can also be consisted of a single signal receiving line or a plurality of signal receiving lines, and the two sets of signal receiving lines can be not adjacent, but with other signal receiving lines disposed therebetween. Sensitivity and area for sensing can be increased by using a plurality of signal transmitting lines or a plurality of signal receiving lines to form each set of the signal transmitting lines or signal receiving lines, so that an proximity of a conductive object without a direct touch to the capacitive-type panel can be sensed. In addition, according to another embodiment of the invention, two sets or more of signal transmitting lines can also be selected from N signal transmitting lines to respectively input a charge/discharge signal, and correspondingly generated voltage signals can be received respectively by two sets or more of signal receiving lines selected from M signal receiving lines. This can be realized by simply using a multiplexer (not shown) to change the line connections. Further, the voltage signal processor 180 can also be constituted by two or more analog/digital converters or a single-bit comparator, and the two or more analog/digital converters can be disposed on different chips. Since this is a common modification of the circuit design, is will not be further described here.

In summary, the embodiments of the invention provide a method and device for sensing a control point, which are applied to the capacitive-type panel. Position information of a control point can be accurately sensed by the method and device without increasing the number of signal lines. While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for sensing a control point on a capacitive-type panel, where a conductive object approaches or contacts, the capacitive-type panel including M signal transmitting lines and N signal receiving lines defining M*N neighboring regions, the method being executed by a sensing device and comprising steps of:

receiving a first voltage signal and a second voltage signal through two sets of signal receiving lines selected from the N signal receiving lines in response to a first charge/discharge signal and a second charge/discharge signal transmitted through two sets of signal transmitting lines selected from the M signal transmitting lines, respectively, during a first time period; receiving a third voltage signal and a fourth voltage signal through the two sets of signal receiving lines selected from the N signal receiving lines in response to a third charge/discharge signal and a fourth charge/discharge signal transmitted through the two sets of signal transmitting lines, respectively, during a second time period, wherein the first charge/discharge signal and the second charge/discharge signal are out of phase; and generating a characteristic value for a neighboring region defined by the two sets of signal transmitting lines and the two sets of signal receiving lines according to the first voltage signal, the second voltage signal, the third voltage signal and the fourth voltage signal; wherein the above three steps are repetitively performed so as to generate a plurality of characteristic values for a plurality of neighboring regions defined by different combinations of signal transmitting lines and signal receiving lines, and position information of at least one control point on the capacitive-type panel is estimated according to the characteristic values, wherein the first charge/discharge signal is a charge signal rising from a low voltage to a high voltage, the second charge/discharge signal is a discharge signal falling from a high voltage to a low voltage, the third charge/discharge signal is a discharge signal falling from a high voltage to a low voltage, and the fourth charge/discharge signal is a charge signal rising from a low voltage to a high voltage; and the step of generating the characteristic value for the neighboring region defined by the two sets of signal transmitting lines and the two sets of signal receiving lines according to the first voltage signal, the second voltage signal, the third voltage signal and the fourth voltage signal comprise:

generating a first voltage difference value or a function value equivalent to the first voltage difference value by comparing the first voltage signal and the second voltage signal;

generating a second voltage difference value or a function value equivalent to the second voltage difference value by comparing the third voltage signal and the fourth voltage signal; and generating the characteristic value by subtracting the second voltage difference value or the function value equivalent to the second voltage difference from the first voltage difference value or the function value equivalent to the first voltage difference.

2. The method for sensing a control point according to claim 1, wherein the characteristic values include a combination of positive number, negative number and zero.

3. The method for sensing a control point according to claim 1, wherein the characteristic values are configured as a characteristic value array, and the position information of the at least one control point on the capacitive-type panel is estimated according to a data pattern included in the characteristic value array.

4. The method for sensing a control point according to claim 3, wherein the position information of the al least one control point is estimated by:

performing an operation on a 3*3 data array selected from the characteristic value array;

determining the position information of the control point and a first offset vector when the result of the operation meets a first condition;

determining the position information of the control point and a second offset vector when the result of the operation meets a second condition;

determining the position information of the control point and a third offset vector when the result of the operation meets a third condition; and determining the position information of the control point and a fourth offset vector when the result of the operation meets a fourth condition.

5. A device for sensing a control point on a capacitive-type panel, where a conductive object approaches or contacts, the capacitive-type panel including M signal transmitting lines and N signal receiving lines defining M*N neighboring regions, the device comprising:

a charge/discharge signal generator electrically connected to the M signal transmitting lines, the charge/discharge signal generator inputting a first charge/discharge signal and a second charge/discharge signal respectively to two sets of signal transmitting lines selected from the M signal transmitting lines during a first time period, and inputting a third charge/discharge signal and a fourth charge/discharge signal respectively to the two sets of signal transmitting lines during a second time period, wherein the first charge/discharge signal and the second charge/discharge signal are out of phase; and a voltage signal processor electrically connected to the N signal receiving lines, the voltage signal processor receiving a first voltage signal and a second voltage signal respectively from two sets of signal receiving lines selected from the N signal receiving lines during the first time period, receiving a third voltage signal and a fourth voltage signal respectively from two sets of signal receiving lines selected from the N signal receiving lines during the second time period, generating a characteristic value for a neighboring region defined by the two sets of signal transmitting lines and the two sets of signal receiving lines according to the first voltage signal, the second voltage signal, the third voltage signal and the fourth voltage signal, wherein the above three steps are repetitively performed so as to generate a plurality of characteristic values for a plurality of neighboring regions defined by different combinations of signal transmitting lines and signal receiving lines, and position information of at least one control point on the capacitive-type panel is estimated according to the characteristic values, wherein the first charge/discharge signal is a charge signal rising from a low voltage to a high voltage, the second charge/discharge signal is a discharge signal falling from a high voltage to a low voltage, the third charge/discharge signal is a discharge signal falling from a high voltage to a low voltage, and the fourth charge/discharge signal is a charge signal rising from a low voltage to a high voltage; and the voltage signal processor generates the characteristic value for the neighboring region defined by the two sets of signal transmitting lines and the two sets of signal receiving lines according to the first voltage signal, the second voltage signal, the third voltage signal and the fourth voltage signal by executing the steps of:

the voltage signal processor generating a first voltage difference value or a function value equivalent to the first voltage difference value by comparing the first voltage signal and the second voltage signal;

the voltage signal processor generating a second voltage difference value or a function value equivalent to the second voltage difference value by comparing the third voltage signal and the fourth voltage signal; and the voltage signal processor generating the characteristic value by subtracting the second voltage difference value or the function value equivalent to the second voltage difference from the first voltage difference value or the function value equivalent to the first voltage difference.

6. The device for sensing a control point according to claim 5, wherein the characteristic values include a combination of positive number, negative number and zero.

7. The device for sensing a control point according to claim 5, wherein the voltage signal processor further executes the steps of:

configuring the characteristic values as a characteristic value array; and estimating the position information of the at least one control point on the capacitive-type panel according to a data pattern included in the characteristic value array.

8. The device for sensing a control point according to claim 7, wherein the voltage signal processor executes the steps of:

performing an operation on a 3*3 array selected from the characteristic value array;

determining the position information of the control point and a first offset vector when the result of the operation meets a first condition;

determining the position information of the control point and a second offset vector when the result of the operation meets a second condition;

determining the position information of the control point and a third offset vector when the result of the operation meets a third condition; and determining the position information of the control point and a fourth offset vector when the result of the operation meets a fourth condition.

* * * * *